Oct. 1, 1963     R. J. SETTIMI     3,105,580
THERMOSTATICALLY CONTROLLED CLUTCH
Filed Dec. 31, 1959
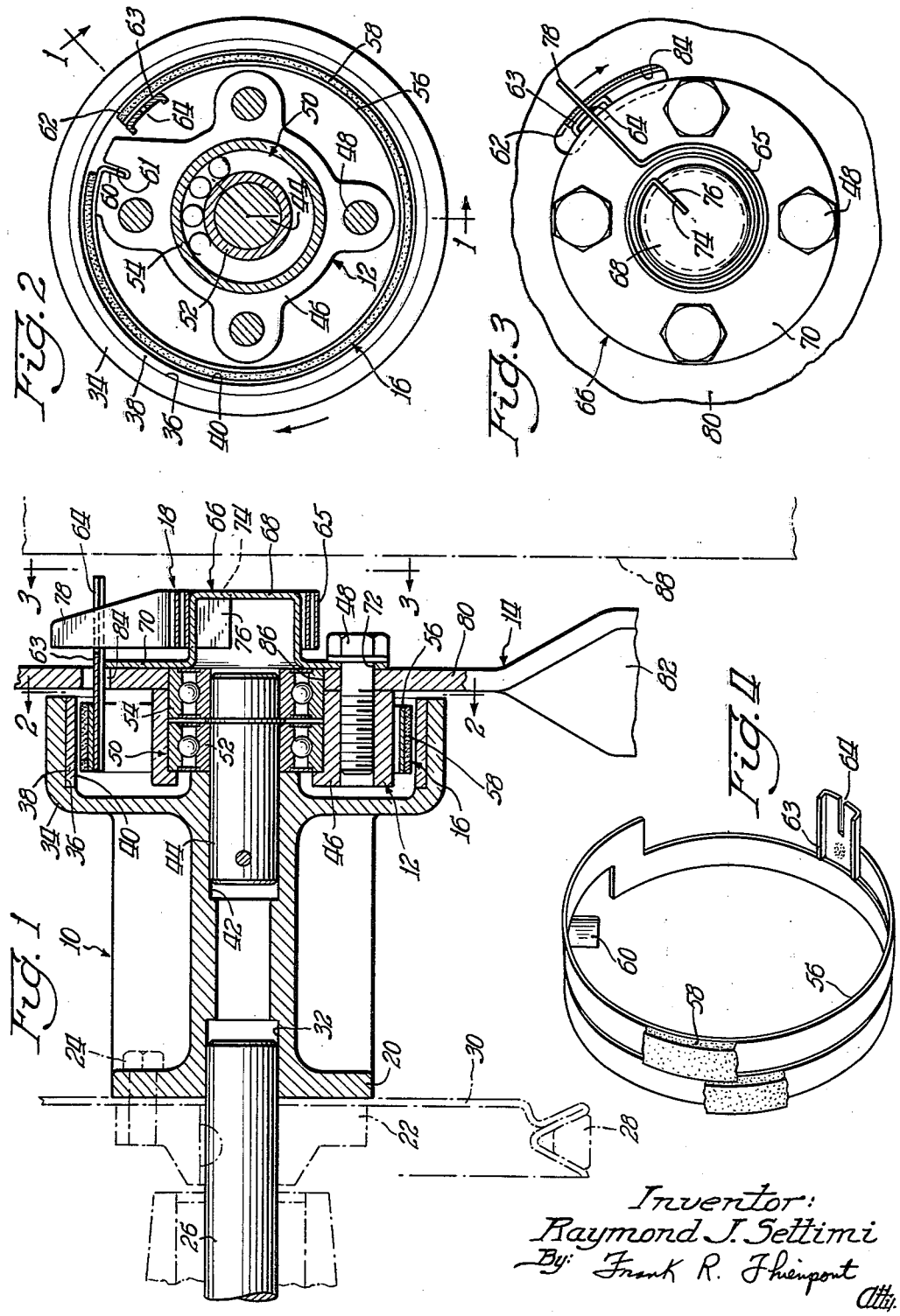
Inventor:
Raymond J. Settimi
By: Frank R. Thienpont
Atty.

United States Patent Office 3,105,580
Patented Oct. 1, 1963

3,105,580
THERMOSTATICALLY CONTROLLED CLUTCH
Raymond J. Settimi, Letchworth, Herts, England, assignor to Borg-Warner Corporation, Chicago, Ill., a corporation of Illinois
Filed Dec. 31, 1959, Ser. No. 863,136
17 Claims. (Cl. 192—82)

This invention relates to clutch devices and more particularly, to clutch devices responsive to ambient temperature conditions and particularly suited for controlling the engagement between a driving means and a driven device such, for example, as a fan.

It is an object of the present invention to provide a clutch mechanism for engaging and disengaging a fan device in response to engine temperatures.

It is a further object to provide a simple and inexpensive clutch device of the friction band type for engaging a fan device with a driving means at a predetermined temperature of the air surrounding such clutch device.

Another object is to provide an improved thermally actuated clutch device wherein the thermal actuating device is a bimetal element fixed to the driven member and adapted to engage the fan assembly with the driving member under certain temperature conditions and disengage the fan assembly from the driving member under other temperature conditions.

It is a further object of this invention to provide an improved clutch mechanism wherein the initial engagement between the driven and driving members is accomplished by means of a thermal element urging a friction band into initial engagement with the driving member, the clutch device being so constructed that further engagement will be effected by centrifugal force and the inherent self-energizing characteristics of the friction band.

A still further object is to provide a clutch mechanism which will provide a quick lock-up and quick release without excess slippage.

Other objects and features of the invention will be readily apparent to those skilled in the art from the specification and appended drawings illustrating a preferred embodiment of the invention in which:

FIG. 1 is an elevational view in section;
FIG. 2 is an end sectional view taken along the line 2—2 of FIG. 1;
FIG. 3 is a partial right end view of the device shown in FIG. 1; and
FIG. 4 is a view in perspective of a multiple wrap friction band.

The device shown in FIG. 1 and constructed in accordance with the principles of this invention comprises generally, a driving member 10, a driven member or fan carrier 12 having mounted thereon a fan assembly 14, a clutching element in the nature of an annular friction band 16 and a thermal element 18 for actuating the friction band 16 to accomplish a driving engagement between the driven member 12 and the driving member 10.

The driving member 10 which may be an aluminum casting, for example, has formed at its one end a generally annular flange 20 for connection to a complementary annular plate 22 by suitable means such as a plurality of bolts 24. The annular plate 22 is fixedly attached to a shaft 26 of a water pump (not shown). The water pump shaft 26 and the water pump attached thereto are adapted to be driven in a conventional manner by a fan belt 28 through a pulley 30, the pulley 30 being bolted to the annular plate 22. The driving member 10 has centrally formed therein an opening 32 to receive the end of the water pump shaft 26. It will be noted that the annular plate 22, the pulley 30 and the flange 20 are bolted together by the bolts 24, the shaft 26 extending through central openings in the plate 22 and the pulley 30 and into the opening 32 of the driving member. Thus the driving member 10 is driven at all times and at the same speed as the water pump shaft 26.

At its right end, as viewed in FIG. 1, there is formed on the driving member 10 a hub or drum 34, the inner annular periphery 36 thereof being lined with a drum liner 38. The inner periphery 40 of the drum liner functions as a clutching surface. The inner periphery 36 of the drum 34 and the outer periphery of the liner 38 may have complementary serrations and projections formed thereon to prevent relative circumferential movement between the drum 34 and the liner 38. Also formed in the driving member 10 is a central opening 42 for receiving a drive shaft 44. The drive shaft 44 may be press fitted, for example, into the central opening 42.

The driven member 12 of this device serves as a fan carrier. The driven member comprises a spider 46 which may be made of cast aluminum, for example. The spider 46 is adapted to receive the fan assembly 14 which may be bolted to the spider by means of a plurality of bolts 48. The spider 46 is journalled for free rotation around the drive shaft 44 by means of a double row of bearings 50 disposed between inner races 52 and outer races 54.

The clutching element 16 comprises an expandable metal band 56 on the outer periphery of which is attached a band of friction material 58. This clutching element may comprise a single wrap band as illustrated in FIG. 2 or may comprise a multiple wrap band, i.e., one which extends more than 360°, as illustrated in FIG. 4. The friction material 58 may be attached to the metal band 56 by a conventional bonding process. The friction material 58 may be made, for example, from material identified as Gatke brake lining Style #2460. On one end of the metal band 56 there is formed a radially inturned portion 60. In an assembled condition, the portion 60 is fitted into a radially extending slot 61 formed in the spider 46. In an assembled condition (see FIG. 2), the slot 61 serves as an anchor point for the inturned portion 60 of the friction band, the friction band being anchored in such a way that the portion 60 may move only in a substantially radial direction relative to the spider. No substantial circumferential movement of the friction band with respect to the spider is possible.

The other end 62 of the friction band 16 is loose and may be referred to as the trailing end 62. As viewed in FIG. 2, the driving member 10 will normally rotate in a clockwise direction as indicated by the arrow. It will be noted that the wrap of the friction band 16 is in a counterclockwise direction progressing from the point at which the portion 60 is anchored in the slot 61 of the spider 46. Fixedly attached to the trailing end 62 of the friction band 16 at the inner periphery thereof is an axially extending control tab 63 having formed therein an axially extending slot 64. The control tab 63 may be spot welded to the metal band 56.

The thermal element 18 sometimes referred to as a thermostatic actuating device or temperature responsive means comprises a bimetal element 65 made in the form of a spiral coil as shown in FIG. 3. The bimetal element 65 is secured to an annular member 66. The member 66, which may be made in the form of a stamping, comprises an axially extending hub portion 68 and a radially extending annular flange 70 extending from the edge of said hub. A plurality of holes 72 are formed in the flange 70 for securing the annular member to the spider 46. The hub portion 68 is formed at the center of the annular member 66 and projects axially as shown in FIG. 1. Formed in the hub portion 68 is a slot 74 for receiving an inner radially inwardly extending tab 76 formed on the inner end of the bimetal element 65.

Formed on the outer end of the spiral bimetal element 65 is a radially outwardly extending tab 78 lying in substantially the same plane as the tab 76.

The fan assembly 14 comprises a central flange portion 80 from which may extend a plurality of blades 82. A circumferentially extending slot 84 extending through an arc of approximately 30° for adequate clearance is formed in the flange portion 80. In the assembled device the control tab 63 of the friction band 56 extends through the slot 84 and is positioned with relation to the bimetal element 65 so that the radially extending tab 78 of the bimetal element 65 is received by the slot 64 of the control tab 63. An aperture 86 is centrally formed in the flange portion 80 so that when assembled this aperture fits around the outermost portion of the bearing 50. Thus in an assembled condition, as shown in FIG. 1, the spider 46 which is journalled on the drive shaft 44, the flange portion 80 of the fan assembly 14 and the radially extending annular flange 70 of the annular member 66 are all secured together by a plurality of bolts 48.

*Operation*

Before describing the operation of this device, it should be pointed out that one of the purposes of this device is to provide simple mechanism which will permit a fan assembly to remain in a disengaged condition while ambient temperatures are below a certain predetermined figure. When the temperature of the surrounding air rises to a certain predetermined figure, the fan is then to be engaged by the driving member and continued in operation until the temperature of the surrounding air is again reduced to a certain temperature when disengagement of the fan will again be effected.

It will be noted in the operation of this device, that the driving member 10, which is connected to the water pump shaft, as illustrated in FIG. 1, will at all times be driven along with the water pump shaft by the pulley 30. During this rotation of the driving member 10, the driven member 12 will rotatingly float on the drive shaft 44. There will in all probability be some rotation of the driven member 12 and the fan assembly 14 assembled thereon due to the frictional drag of the bearings 50 which cannot be completely eliminated. It will be noted that while the driven member 12 is not engaged with the driving member 10, there is no power consumption by the driven member and this, of course, is one of the desirable results sought to be obtained.

A device of this type in an automotive environment would normally be located immediately to the rear of the radiator of a vehicle, a radiator being shown schematically in FIG. 1 at 88. As is well known, in a conventional automobile a coolant circulating through an engine is circulated through a radiator, thus heating the radiator and the air which would normally pass through the radiator from the front to the rear and over the engine. Assuming that this device is located immediately to the rear of an automobile radiator as shown in FIG. 1, it is apparent that the temperature surrounding this device will increase with increase in engine temperature. It is desirable, if possible, that engine temperature be increased to a predetermined amount but that it not exceed a certain upper range. On the other hand, it is also desirable to keep the engine temperature and the temperature of the air surrounding an engine above a certain lower limit to help maintain maximum efficiency. Thus it would be well to dispense with the cooling effects of a constantly rotating fan when the engine temperature and temperature of air flowing over the engine reaches a relatively low value, and to have the fan engage to provide a flow of cooling air when the engine temperature is at a relatively higher value. In operation, when the engine temperature increases to a certain predetermined value, the coils of the bimetal element 65 will tend to expand in the particular construction shown. The different coefficients of expansion of the bimetal element 65 will cause the coils of the bimetal element to expand and thus, to move the outer tab 78 in a clockwise direction as indicated by the arrow in FIG. 3. This clockwise movement of the tab 78 moves the trailing end 62 of the friction band 16 circumferentially to the right as seen in FIG. 2, thereby radially expanding the entire clutching element 16. As soon as the clutching element 16 is expanded sufficiently to make an initial contact with the clutching surface 40 formed on the inner periphery of the drum liner 38, this initial frictional engagement will cause rotational movement of the driven member 12. As this frictional engagement increases, the speed of the driven member increases being effective to exert a constantly increasing centrifugal force on the clutching element 16. Eventually, the self-energizing characteristics of the clutching element 16 effect a complete engagement between the clutching element and the clutching surface 40 so that the driven member 12 and the fan assembly 14 attached thereto assume the same speed as the driving member 10. It is to be noted here that the thermal element 18 is effective only to cause the initial engagement of the clutching element 16 with the clutching surface 40. It is not contemplated that the force exerted by the thermal element 18 will be sufficient to expand the clutching element 16 with sufficient force to effect in and of itself a complete and positive engagement between the driving and driven members.

As the rotating fan cools the air the coils of the thermal element will tend to contract and tend to move the outer tab 78 counterclockwise, and a torque will be exerted on the trailing end 62 of the clutching element 16 in a direction tending to free this trailing end from engagement with the clutching surface. This torque builds up progressively as the degree of cooling progresses until it is able to overcome both the centrifugal and engaging force inherent in the driven clutching element. Due to the accumulated torque, when the disengaging action once begins, it goes to complete engagement rather quickly. Since the centrifugal force becomes less and less as the fan becomes partially disengaged, it is apparent that this engagement once begun, progresses rapidly.

Thus it can be seen that this device advantageously provides a simply constructed thermally actuated friction band clutching mechanism for engaging and disengaging an automobile engine cooling fan in response to varying temperature conditions. This device advantageously allows a cooling fan to remain in a disengaged position at a relatively low engine operating temperature when excess cooling would not be desirable, and it also provides for engagement of the fan when such cooling effects eventually are required.

It should also be pointed out that while the embodiment here described has been described in relation to an automotive environment, such a clutching device may be used in a variety of other instances where selective engagement and disengagement of a driven device are desired.

While a certain preferred embodiment of the invention has been specifically disclosed, it is understood that the invention is not limited thereto as many variations will be readily apparent to those skilled in the art and the invention is to be given its broadest possible interpretation within the terms of the following claims.

I claim:

1. A clutch mechanism comprising: a driving member, a driven member coaxially mounted on said driving member for floating rotation thereon, an axially extending radially expansible one piece band clutching element mounted on said driven member for drivingly connecting said driving and driven members, and thermally responsive means mounted on said driven member and connected to said clutching element for urging said clutching element into position to drivingly connect said driving and driven members.

2. The device of claim 1 wherein said thermally responsive means comprises a bimetal element one end thereof being connected to said driven member and the outer end being connected to said clutching element for displacing said clutching element relative to said driven member and for moving said clutching element into engagement with said driving member to thereby initiate a drive between said driving and driven members.

3. The device of claim 1 wherein said clutching element comprises a radially and circumferentially expandable friction band and wherein said thermally responsive means comprises a bimetal element the inner end thereof being connected to said driven member and the outer end being connected to said clutching element, said bimetal element being so constructed and arranged that in response to an increase in the temperature of said bimetal, said clutching element will be urged to an engaging position.

4. A self-energizing band clutch comprising: a driving member, a driven member coaxially mounted on said driving member for floating rotation thereon, a one piece split friction band clutching element mounted on said driven member for drivingly connecting said driving and driven members and means for bringing said clutching element into engagement with said driving member, said means comprising a thermally actuated element.

5. The device of claim 4 wherein said thermally actuated element is mounted on said driven member.

6. A clutch mechanism comprising: a driving member having formed thereon a drum, said drum being provided with means defining an internal clutching surface; a driven member coaxially and rotatably mounted on said driving member; a radially expandable clutching element mounted on said driven member for drivingly connecting said driving and driven members; means connected to said driven member for radially expanding said clutching element, said means comprising a bimetal coil connected at one end to said driven member and at the other end to said clutching element, said bimetal coil being effective to radially expand said clutching element to initial engagement with said internal clutching surface in response to a predetermined change in temperature.

7. In a clutch device to effect engagement between a driving member and a vehicle fan, the combination comprising a driving member adapted to be rotated, a driven member concentrically and rotatably mounted on said driving member, friction band means mounted on said driven member and connected at one end thereof to said driven member, thermally actuated means connected to the other end of said friction band means and comprising a bimetal element operable to effect radial expansion of said friction band means to establish a torque transmitting drive between said driving and driven members through said friction band means.

8. The device of claim 7 wherein the bimetal element comprises a spiral coil, said bimetal element being connected to said friction band means to effect expansion and consequent engagement of the friction band means with the driving member when said bimetal element is subjected to temperatures in a predetermined range.

9. The device of claim 7 wherein the bimetal element comprises a spiral coil, said bimetal element being connected to said friction band means to effect expansion and consequent engagement of the friction band means with the driving member at relatively higher temperature conditions and further to effect contraction and consequent disengagement of the friction band means with the driving member at relatively lower temperature conditions.

10. The device of claim 7 wherein the bimetal element is operable to effect circumferential movement of said friction band relative to said driven member and in the same direction as the direction of rotation of said driving member to effect a self-energizing clutching action.

11. A clutch mechanism comprising: a driving member adapted to be rotated and having a hub formed thereon, an internal clutching surface formed on said hub, a driven member coaxially and rotatably mounted in relation to said hub, a clutching means comprising a single wrap internal friction band mounted on and loosely connected to said driven member to permit radial displacement of said friction band, a thermally responsive element comprising a bimetallic expansible spiral coil, means connecting the inner end of said thermally responsive element to said driven member and means connecting the outer end of said thermally responsive element to said friction band, said thermally responsive element when heated to a predetermined temperature being effective to move said friction band into engagement with said internal clutching surface.

12. A clutch mechanism comprising: a driving member adapted to be rotated, an internal clutching surface formed on said driving member, a driven member, a clutching element comprising a one piece split friction band for establishing a driving connection between said driving and driven members, said friction band having a first end thereof connected to an anchor point on said driven member so as to permit radial movement of said first end and a trailing end which is free to be radially expanded, said friction band being wrapped from said anchor point within said driving member in a direction opposite to the normal rotation of said driving member, and an actuating device connected to said trailing end of said friction band, said device when actuated being effective to expand said trailing end into initial engagement with said internal clutching surface.

13. The clutch mechanism of claim 12 wherein the actuating device comprises a thermal element fixed to said driven member and connected to said trailing end of said friction band so that said thermal element in response to a predetermined amount of heat will be effective to expand said friction band into initial engagement with said clutching surface.

14. A cooling fan assembly comprising: a driving member including a drum portion having a clutching surface formed on the internal periphery thereof; a driven member rotatably mounted on said driving member for floating rotation thereon; a fan mounted on said driven member to be driven therewith; an axially extending radial expansible one-piece split friction band means for intermittently connecting said driving and driven members, said band having two ends; means connecting one end of said friction band to the driven member; actuating means fixedly attached to the driven member for intermittently connecting the driving and driven members by expanding the friction band means into engagement with said clutching surface, said actuating means comprising a thermally responsive means; and means connecting the actuating means to the other end of said friction band means.

15. A cooling fan assembly comprising: a driving member adapted to be driven by a power source and including a drum portion having a clutching surface formed on the internal periphery thereof; a hub portion formed on said driving member; a driven member rotatably mounted on said hub portion of said driving member for floating rotation thereon; a fan mounted on said driven member to be driven therewith; an axially extending radial expansible one-piece split friction band means for intermittently connecting said driving and driven members, said band having two ends; means connecting one end of said friction band to the driven member, said means being constructed and arranged to permit said one end to move outwardly into engagement with said clutching surface; actuating means fixedly attached to the driven member for intermittently connecting the driving and driven members by expanding the friction band means into engagement with said clutching surface, said actuating means comprising a thermally responsive means; and means connecting the actuating means to the other end of said friction band means.

16. An engine cooling apparatus comprising in combination: a driving member; a driven member; a fan assembly mounted on said driven member; a clutching element mounted on said driven member for drivingly connecting said driving and driven members, said clutching element comprising a single wrap expansible friction band; temperature responsive means mounted on said driven member for urging said clutching element into engagement with said driving member; means connecting said temperature responsive means to said clutching element, said means extending through said fan assembly.

17. An engine cooling apparatus comprising in combination: a driving member; a driven member; a fan assembly mounted on said driven member; a clutching element mounted on said driven member for drivingly connecting said driving and driven members, said clutching element comprising a multiple wrap expansible friction band; temperature responsive means mounted on said driven member for urging said clutching element into engagement with said driving member; means connecting said temperature responsive means to said clutching element, said means extending through said fan assembly.

References Cited in the file of this patent

UNITED STATES PATENTS

| | | |
|---|---|---|
| 292,172 | Mills | Jan. 22, 1884 |
| 703,301 | Poulson | June 24, 1902 |
| 730,724 | Weimar et al. | June 9, 1903 |
| 1,051,854 | Armstrong | Feb. 4, 1913 |
| 1,433,399 | Modine | Oct. 24, 1922 |
| 1,765,063 | Eberling | June 17, 1930 |
| 1,872,986 | Lane | Aug. 23, 1932 |
| 1,915,439 | Nieman | June 27, 1933 |
| 2,087,488 | Stanley | July 20, 1937 |
| 2,320,900 | Walz | June 1, 1943 |
| 2,355,710 | Dodge | Aug. 15, 1944 |
| 2,603,420 | Tacchi | July 15, 1952 |
| 2,652,816 | Dodge | Sept. 22, 1953 |
| 2,811,956 | Lauck | Nov. 5, 1957 |
| 2,881,890 | Welch | Apr. 14, 1959 |
| 2,986,250 | Becker | May 30, 1961 |

FOREIGN PATENTS

| | | |
|---|---|---|
| 410,026 | Germany | Feb. 21, 1925 |
| 703,886 | Germany | Mar. 19, 1941 |